(12) United States Patent  
Yamamoto et al.

(10) Patent No.: US 8,319,994 B2  
(45) Date of Patent: Nov. 27, 2012

(54) MOBILE TERMINAL, PRINTING SYSTEM AND PRINTING METHOD

(75) Inventors: Hiroyuki Yamamoto, Matsumoto (JP); Katsunori Nagao, Matsumoto (JP); Shingo Sato, Tokyo (JP); Kazuhiro Itagaki, Tokyo (JP); Kengo Egawa, Tokyo (JP); Atsushi Kamimura, Tokyo (JP)

(73) Assignee: Seiko Epson Corporation and Sammy Networks Co., Ltd., Tokyo (JP)

( * ) Notice: Subject to any disclaimer, the term of this patent is extended or adjusted under 35 U.S.C. 154(b) by 460 days.

(21) Appl. No.: 12/074,365

(22) Filed: Mar. 3, 2008

(65) Prior Publication Data

US 2008/0228949 A1    Sep. 18, 2008

(30) Foreign Application Priority Data

Mar. 2, 2007   (JP) ................ P2007-053383

(51) Int. Cl.
- *G06F 3/12* (2006.01)
- *G06F 15/16* (2006.01)
- *H04M 1/66* (2006.01)

(52) U.S. Cl. .................. 358/1.15; 455/411; 709/203

(58) Field of Classification Search .............. 709/225, 709/203; 358/1.15, 1.6; 455/411
See application file for complete search history.

(56) References Cited

U.S. PATENT DOCUMENTS

| | | | |
|---|---|---|---|
| 5,220,674 A * | 6/1993 | Morgan et al. ............... 709/223 |
| 5,303,336 A * | 4/1994 | Kageyama et al. ........... 358/1.15 |
| 5,548,578 A * | 8/1996 | Matsune et al. ............... 370/248 |
| 6,091,507 A * | 7/2000 | Vatland et al. ................ 358/1.15 |
| 6,437,869 B1 * | 8/2002 | Matoba .......................... 358/1.13 |
| 6,801,962 B2 * | 10/2004 | Taniguchi et al. ............. 710/33 |
| 6,880,075 B1 * | 4/2005 | Fukano et al. .................... 713/1 |
| 6,912,061 B1 * | 6/2005 | Ozaki ........................... 358/1.15 |
| 7,158,253 B2 * | 1/2007 | Matoba ........................ 358/1.15 |
| 7,161,699 B2 * | 1/2007 | Matoba ........................ 358/1.15 |

(Continued)

FOREIGN PATENT DOCUMENTS

JP    2001-334709    12/2001

(Continued)

*Primary Examiner* — Firmin Backer  
*Assistant Examiner* — Michael A Chambers  
(74) *Attorney, Agent, or Firm* — Nutter McClennen & Fish LLP; John J. Penny, Jr.; Michael P. Visconti, III

(57) ABSTRACT

A first reception section is operable to receive an input to designate thumbnails of printing images from an image storage server. A first transmitter is operable to transmit an image transmission request for requesting the thumbnails to the image storage server when the input to designate the thumbnails is received by the first reception section. A first receiver is operable to receive the thumbnails from the image storage server. A second reception section is operable to receive a designation of the printing images based on the thumbnails received by the first receiver. A local area transceiver is operable to transmit an identification information request for requesting identification information of a printing device to the printing device using a local area radio communication and receives the identification information from the printing device. A second transmitter is operable to transmit the image transmission request for requesting the printing images when an input to designate the printing images corresponding to the thumbnails is received by the second reception section. A third transmitter is operable to transmit the identification information received from the local area transceiver to the image storage server. A second receiver is operable to receive the printing images from the image storage server. The local area transceiver transmits the printing images received from the image storage server by the second receiver to the printing device.

10 Claims, 4 Drawing Sheets

U.S. PATENT DOCUMENTS

| | | | |
|---|---|---|---|
| 7,280,237 B2 * | 10/2007 | Komiya | 358/1.13 |
| 7,286,251 B2 * | 10/2007 | Tomida et al. | 358/1.15 |
| 7,359,696 B2 * | 4/2008 | Tanaka et al. | 455/411 |
| 7,679,769 B2 * | 3/2010 | Yamada et al. | 358/1.15 |
| 2002/0013869 A1 * | 1/2002 | Taniguchi et al. | 710/33 |
| 2002/0048034 A1 * | 4/2002 | Matoba | 358/1.13 |
| 2002/0054345 A1 * | 5/2002 | Tomida et al. | 358/1.15 |
| 2002/0114005 A1 * | 8/2002 | Matoba | 358/1.15 |
| 2002/0114006 A1 * | 8/2002 | Matoba | 358/1.15 |
| 2004/0223185 A1 * | 11/2004 | Yamada et al. | 358/1.15 |
| 2005/0037734 A1 * | 2/2005 | Tanaka et al. | 455/411 |
| 2005/0193153 A1 * | 9/2005 | Fukano et al. | 710/8 |
| 2005/0198291 A1 * | 9/2005 | Hull et al. | 709/225 |
| 2005/0199699 A1 * | 9/2005 | Sato et al. | 235/375 |
| 2005/0261018 A1 * | 11/2005 | Yamamoto | 455/522 |
| 2006/0114498 A1 * | 6/2006 | Yanagi et al. | 358/1.15 |
| 2006/0253610 A1 * | 11/2006 | Yamada et al. | 709/245 |
| 2007/0103703 A1 * | 5/2007 | Matoba | 358/1.6 |
| 2007/0168514 A1 * | 7/2007 | Cocotis et al. | 709/225 |
| 2008/0146196 A1 * | 6/2008 | Tanaka et al. | 455/411 |
| 2010/0210953 A1 * | 8/2010 | Sholder et al. | 600/484 |
| 2011/0156879 A1 * | 6/2011 | Matsushita et al. | 340/10.1 |

FOREIGN PATENT DOCUMENTS

| | | |
|---|---|---|
| JP | 2001-344435 | 12/2001 |
| JP | 2005-149158 A | 6/2005 |
| JP | 2005-348085 | 12/2005 |
| JP | 2006066966 A * | 3/2006 |
| JP | 2006-285331 A | 10/2006 |
| JP | 2006-287745 A | 10/2006 |

* cited by examiner

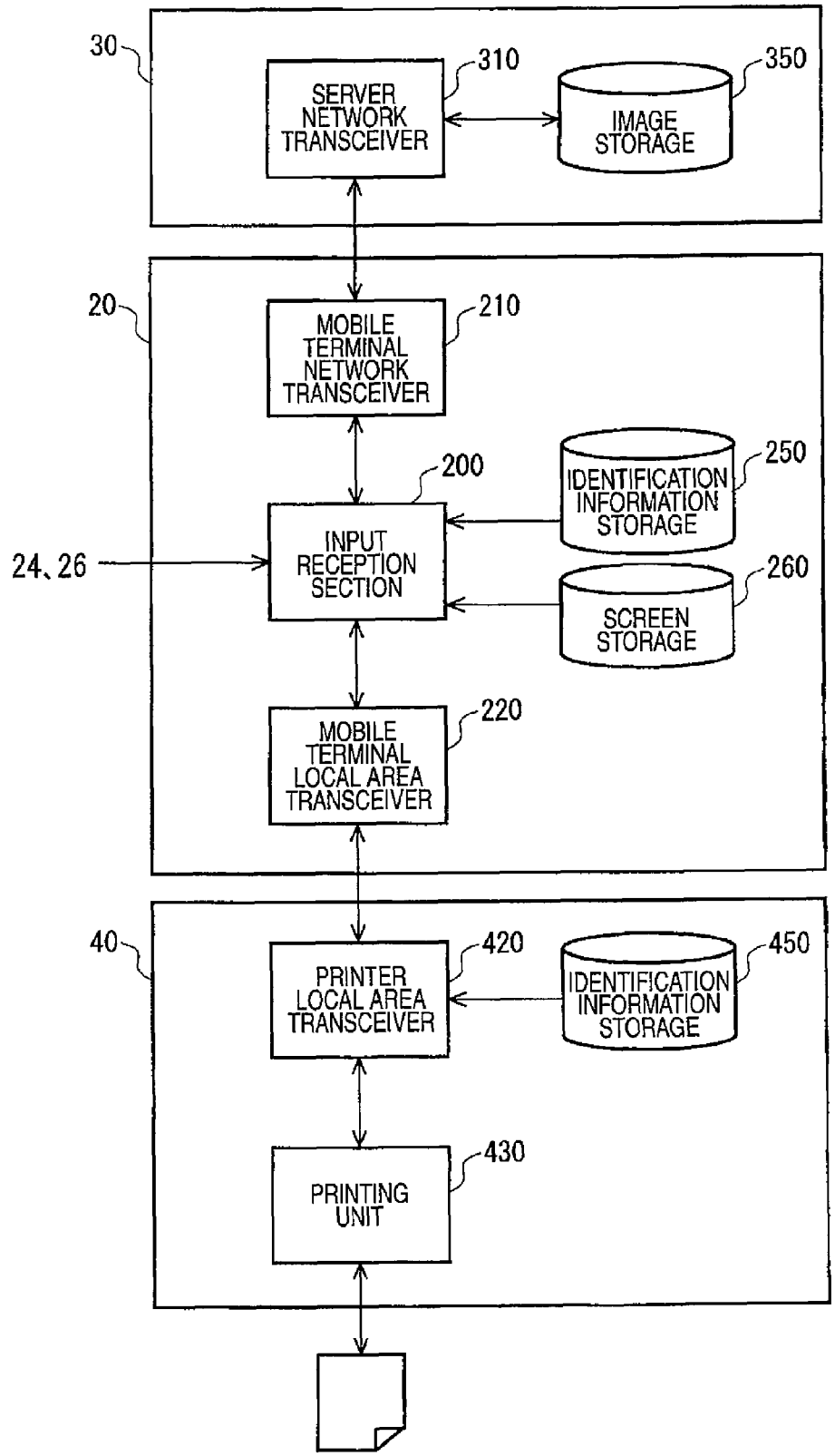

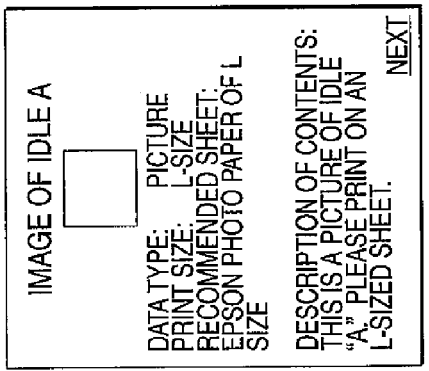

FIG. 3(a)

MENU

ABOUT THIS SERVICE
ACQUIRE IMAGE LIST
INQUIRIES

...

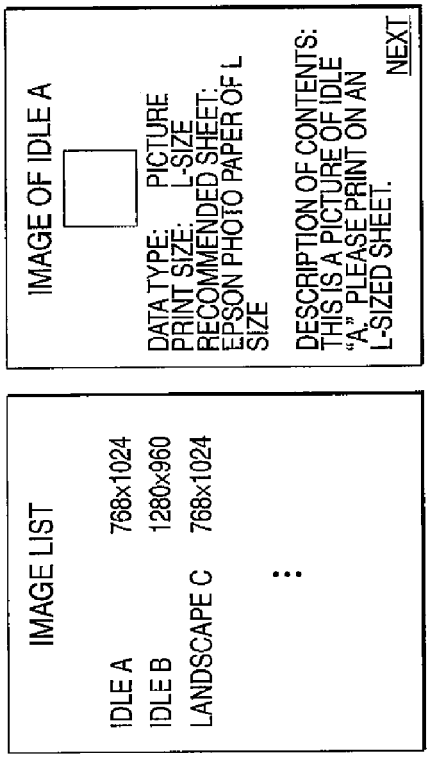

FIG. 3(b)

ACQUISITION OF LIST

A LIST CORRESPONDING TO A PRINTER WILL BE ACQUIRED FROM A SERVER. PLEASE PRESS "REQUEST LIST" WITH AN INFRARED TRANSMITTER DIRECTED TOWARD A PRINTER.

REQUEST LIST

FIG. 3(c)

IMAGE LIST

IDLE A          768×1024
IDLE B          1280×960
LANDSCAPE C     768×1024

IMAGE OF IDLE A

DATA TYPE:          PICTURE
PRINT SIZE:         L-SIZE
RECOMMENDED SHEET:  EPSON PHOTO PAPER OF L SIZE

DESCRIPTION OF CONTENTS:
THIS IS A PICTURE OF IDLE "A". PLEASE PRINT ON AN L-SIZED SHEET.

NEXT

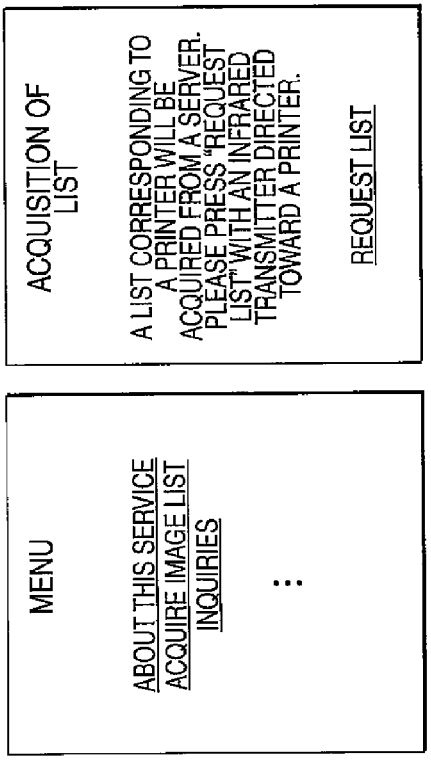

FIG. 3(e)

CONFIRMATION OF SETTINGS

PLEASE CONFIRM THAT YOUR PRINTER SETTINGS ARE AS FOLLOWS.

• SHEET TYPE: PHOTO PAPER   CHANGE
• SHEET SIZE: L SIZE        CHANGE
• LAYOUT: MARGINLESS        CHANGE
• QUALITY: CLEAR            CHANGE
• FILTER: NONE              CHANGE

NEXT

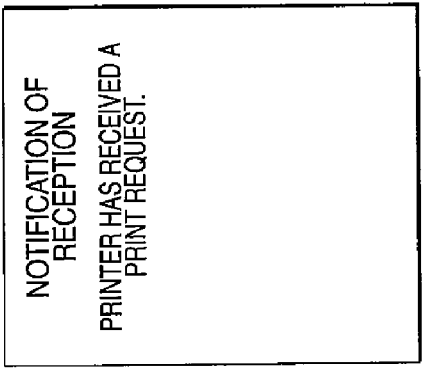

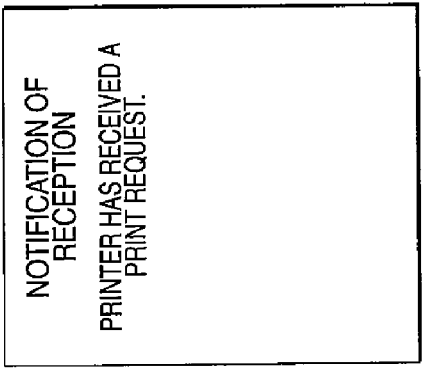

FIG. 3(f)

PRINT

PRINTING WILL BE STARTED BY AN INFRARED COMMUNICATION. PLEASE PRESS "START PRINTING" WITH AN INFRARED TRANSMITTER DIRECTED TOWARD A PRINTER.

START PRINTING

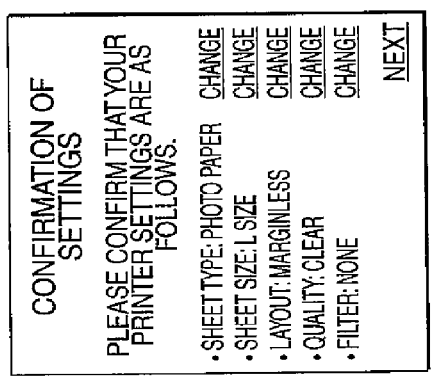

FIG. 3(g)

NOTIFICATION OF RECEPTION

PRINTER HAS RECEIVED A PRINT REQUEST.

MOBILE TERMINAL, PRINTING SYSTEM AND PRINTING METHOD

The disclosure of Japanese Patent Application No. 2007-053383 filed. Mar. 2, 2007 including specification, drawings and claims is incorporated herein by reference in its entirety.

BACKGROUND

The present invention relates to a mobile terminal, a printing system, and a printing method. In particular, the present invention relates to a mobile terminal, a printing system and a printing method that acquire printing images from an image storage server.

In the past, a telephone is known in which image data input to a slave unit are transmitted to a master unit by means of a radio communication means and the image data are printed using a printing device installed in the master device (see Patent Document 1, for example).

Patent Document 1: Japanese Patent Publication No. 2005-348085A

However, according to the technology of Patent Document 1, when the image data are input to the slave unit, the slave unit identifies the image data to determine whether the image data will be transmitted to the master unit. Therefore, in the technology of Patent Document 1, the image data that need not be transmitted to the master unit are input to the slave unit. When the technology is used in paid services that charge for each image data, there is a problem that the image data that are not printed in the master unit are also charged.

SUMMARY

In order to solve the problems, according to a first aspect of the invention, there is provided a mobile terminal comprising: a first reception section operable to receive an input to designate thumbnails of printing images from an image storage server; a first transmitter operable to transmit an image transmission request for requesting the thumbnails to the image storage server when the input to designate the thumbnails is received by the first reception section; a first receiver operable to receive the thumbnails from the image storage server; a second reception section operable to receive a designation of the printing images based on the thumbnails received by the first receiver; a local area transceiver operable to transmit an identification information request for requesting identification information of a printing device to the printing device using a local area radio communication and receives the identification information from the printing device; a second transmitter operable to transmit the image transmission request for requesting the printing images when an input to designate the printing images corresponding to the thumbnails is received by the second reception section; a third transmitter operable to transmit the identification information received from the local area transceiver to the image storage server; and a second receiver operable to receive the printing images from the image storage server, wherein the local area transceiver transmits the printing images received from the image storage server by the second receiver to the printing device. With this configuration, since the printing images of which the contents are identified by the thumbnails are transmitted to the mobile terminal, it is possible to obviate a problem that unnecessary printing images are transmitted to the mobile terminal.

When the input to designate the printing images corresponding to the thumbnails is received by the second reception section, the local area transceiver may transmit the identification information request to the printing device and receive the identification information from the printing device before the second transmitter transmits the image transmission request to the image storage server, and when the identification information is received by the local area transceiver from the panting device, the second transmitter may transmit the image transmission request to the image storage server and the second receiver may receive the printing images correlated to the identification information from the image storage server. With this configuration, it is possible to specify the printing device immediately before the image data are transmitted from the mobile terminal to the printing device. In addition, it is possible to acquire the image, data that are optimal to the printing device for use in the printing the printing data and transmit the acquired, optimal image data to the printing device. For example, among the image data of the same contents of which the resolution or tone is different, image data that is optimal to the kind of the printing device is acquired and printing is performed based on the optimal image data.

The mobile terminal may father comprise an identification information storage operable to store the identification information; and a third reception section operable to receive a print setting input of the printing images received from the image storage server by making a display screen to display different print setting screens of the printing images depending on the identification information stored in the identification information storage. With this configuration, it is possible to perform print settings in accordance with the printing device for use in printing the image data.

The mobile terminal may further comprise an identification information storage operable to store the identification information; a fourth reception section operable to receive an input to acquire a list of the printing images stored in the image storage server through a display screen; and a third receiver operable to transmit a list transmission request containing the identification information stored in the identification information storage to the image storage server and receive the list of the printing images correlated to the identification information contained in the list transmission request when the input to acquire the list is received by the fourth reception section, wherein when the list is received by the third receiver, the first reception section receives the input to designate the thumbnails by making a display screen to display the list of the printing images. With this configuration, it is possible to acquire list information of the image data in accordance with the printing device, making it easy to acquire the image data in accordance with the printing device.

After the fourth reception section receives the input to acquire the list and before the third receiver transmit the list transmission request to the image storage server, the local area transceiver may receive the identification information from the printing device and the identification information storage may store the received identification information. With this configuration, it is possible to acquire list information of the image data in accordance with the printing device for use in printing the image data, making it easy to acquire the image data in accordance with the printing device.

In order to solve the problems, according to a second aspect of the invention, there is provided a printing system, comprising; a mobile terminal; an image storage server; and a printing device, wherein the mobile terminal comprises: a first reception section operable to receive an input to designate thumbnails of printing images from the image storage server; a first receiver operable to receive the thumbnails from the image storage server; a second reception section operable to receive an input to designate the printing images based on the thumbnails received by the first receiver; a local area transceiver operable to transmit an identification information request for requesting identification information of the printing device to the printing device using a local area radio communication and receive the identification information from the printing device; a second transmitter operable to transmit an image transmission request for requesting the printing images when the input to designate the printing images corresponding to the thumbnails is received by the second reception section; a third transmitter operable to transmit the identification information received from the local area transceiver to the image storage server; and a second receiver for receiving the printing images from the image storage server; wherein the image storage server comprises: an image storage storing the printing images and the thumbnails in a correlated manner with the identification information; a first server transmitter operable to transmit the thumbnail stored in the image storage to the first receiver when the image transmission request for requesting the thumbnails received from the second transmitter; a first server receiver operable to receive the image transmission request for requesting the printing images from the second transmitter; and a second server transmitter operable to transmit the printing images stored in the image storage to the second receiver when the image reception request is received by the first server receiver; and wherein the local area transceiver transmits the printing images received by the second receiver to the printing device. With this configuration, it is possible to provide the same advantage as the first aspect.

When the input to designate the printing images corresponding to the thumbnails is received by the second reception section, the local area transceiver may transmit the identification information request to the printing device before the image transmission request is transmitted by the second transmitter to the first server receiver and receives the identification information from the printing device; when the identification information is received by the local area transceiver, the second transmitter may transmit the image transmission request for requesting the printing images, the image transmission request containing the identification information; to the first server receiver; and when the image transmission request for requesting the printing images is received from the second transmitter, the server transmitter may transmit the printing images stored in the image storage in a correlated manner with the identification information contained in the image transmission request to the second receiver. With this configuration, it is possible to provide the same advantage as the first aspect.

The mobile terminal may further comprise: an identification information storage operable to store the identification information; a second reception section operable to receive an input to acquire a list of the printing images stored in the image storage; and a fourth transmitter operable to transmit a list transmission request containing the identification information stored in the identification information storage to the image storage server when the input to acquire the list is received by the second reception section. The image storage server may further comprise a third server transmitter operable to extract the printing images stored in the image storage in a correlated manner with the identification information contained in the list transmission request and transmit the list of the extracted printing images to the mobile terminal when the list transmission request containing the identification information is received from the fourth transmitter. When the list is transmitted from the third server transmitter, the first reception section may receive the input to designate the thumbnails by making a display screen to display the list of the printing images. With this configuration, it is possible to provide the same advantage as the first aspect.

In order to solve the problems, according to a third aspect of the invention, there is provided a printing method using a mobile terminal that acquires printing images from an image storage server that stores the printing images and thumbnails of the printing images in a correlated manner with identification information of a printing device for printing the printing images and transmits the acquired printing images to the printing device, the printing method comprising: an reception step for receiving an input to designate the printing images or the thumbnails of the printing images, to be acquired from the image storage server through a display screen; a network transmitting step for transmitting an image transmission request for requesting the printing images or the thumbnails to the image storage server via a network; a network receiving step for receiving the printing images or the thumbnails from the image storage server via the network; a local area transmitting step for transmitting an identification information request for requesting the identification information of the printing device to the printing device using a local area radio communication; and a local area receiving step for receiving the identification information from the printing device, wherein when the input to designate the thumbnails is received in the input reception step, the image transmission request for requesting the designated thumbnails is transmitted to the image storage server in the network transmitting step and the designated thumbnails are received from the image storage server in the network receiving step; wherein when the input to designate the printing images corresponding to the designated thumbnails is received in the input reception step, the image transmission request for requesting the designated printing images to the image storage server in the network transmitting step and the designated printing images are received from the image storage server in the network receiving step; and wherein the printing images received from the image storage server are transmitted to the printing device in the local area transmitting step. With this configuration, it is possible to provide the same advantage as the first aspect.

It is noted that the summary of the invention described above does not necessarily describe all features of the aspects of the invention. The invention may also be a sub-combination of the features described above.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a block diagram illustrating a mobile terminal, a server, and a printer according to the embodiment;

FIGS. 3(a) to 3(g) are views of an example of information stared in a screen storage according to the embodiment.

DETAILED DESCRIPTION OF THE EMBODIMENTS

The invention will now be described based on preferred embodiments, which do not intend to limit the scope of the invention, but exemplify the invention. All of the features and the combinations thereof described in the embodiments are not necessarily essential to the invention.

Figure 1:
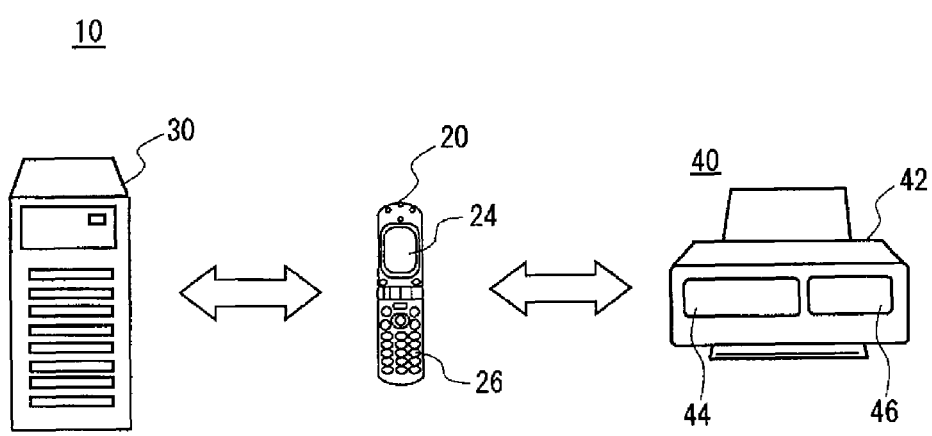
FIG. 1 is a schematic view illustrating an example of a printing system according to an embodiment of the present invention.

FIG. 1 shows an example of a printing system 10. The printing system 10 includes a server 30, which is an example of an image storage server, a mobile terminal 20, and a printer 40, which is an example of a printing device. The server 30 stores images to be printed (hereinafter, referred to as "printing images") and thumbnails of the printing images in a correlated manner with identification information for identifying printers. The server 30 is installed on the Internet, for example.

The mobile terminal 20 includes a display 24 and an operation panel 26. The mobile terminal 20 is a mobile phone, for example, and is configured to acquire the printing images and the thumbnails from the server 30 via a gateway on a radio access network and a core network. The mobile terminal 20 transmits the acquired printing images to the printer 40. Examples of local area radio communication include the IrDA (Infrared Data Association) that uses infrared signals and the Bluetooth that uses radio signals having a frequency of 2.45 GHz.

The printer 40 includes a main body 42, a display 44, and an operation panel 46 and is configured to print the printing images received from the mobile terminal 20 on a print sheet.

FIG. 2 shows an example of the mobile terminal 20, the server 30, and the printer 40. FIGS. 3(a) to 3(g) show examples of information stored in a screen storage 260. As shown in FIG. 2, the mobile terminal 20 includes an input reception unit 200, a mobile terminal network transceiver 210, a mobile terminal local area transceiver 220, an identification information storage 250, and a screen storage 260. The server 30 includes a server network transceiver 310 and an image storage 350. The printer 40 includes a printer local area transceiver 420, a printing unit 430, and an identification information storage 450.

The screen storage 260 of the mobile terminal 20 stores pages to be displayed to a display 24 of the mobile terminal 20. In the examples shown in FIGS. 3(a) to 3(g), the screen storage 260 of the mobile terminal 20 stores a page shown in FIG. 3(a) as an example of a menu page, which is an initial screen of the printing system 10. The screen storage 260 of the mobile terminal 20 stores a page shown in FIG. 3(b) as an example of a page for receiving an input to acquire, from the server 30, a list of printing images stored in the server 30. The screen storage 260 of the mobile terminal 20 stores a page shown in FIG. 3(c) as an example of a page for displaying the painting images contained in the list in a listed view and a page for receiving an input to designate the thumbnails to be acquired from the server 30. The screen storage 260 of the mobile terminal 20 stores a page shown in FIG. 3(d) as an example of a page for displaying the thumbnails acquired from the server 30. The screen storage 260 of the mobile terminal 20 stores a page shown in FIG. 3(e) as an example of a page for receiving a print setting input of the printing images. The screen storage 260 of the mobile terminal 20 stores a page shown in FIG. 3(f) as an example of a page for receiving an input to start printing of the printing images corresponding to the thumbnail. The screen storage 260 of the mobile terminal 20 stores a page shown in FIG. 3(g) as an example of a page for displaying that the printer 40 has received the printing images.

The input reception unit 200 of the mobile terminal 20 receives an input to acquire, from the server 30, a list of the printing images stored in the server 30 from a user. For example, the input reception unit 200 of the mobile terminal 20 receives the input to acquire the list from the server 30 when "Request List" is pressed in the page shown in FIG. 3(b). The input reception unit 200 of the mobile terminal 20 displays the page shown in FIG. 3(b) when "Acquire Image List" is pressed in the page shown in FIG. 3(a).

The input reception unit 200 of the mobile terminal 20 displays the printing images contained in the list in a listed view when the mobile terminal network transceiver 210 of the mobile terminal 20 receives the list of the printing images from the server 30, as described later. For example, the input reception unit 200 of the mobile terminal 20 displays the image names of the printing images contained in the list in a listed view on the page shown in FIG. 3(c).

The input reception unit 200 of the mobile terminal 20 receives an input to designate the thumbnails to be acquired from the server 30. For example, the input to designate the thumbnails is received when the image names are selected on the page shown in FIG. 3(c).

The input reception unit 200 of the mobile terminal 20 displays the thumbnails when the mobile terminal network transceiver 210 of the mobile terminal 20 receives the thumbnails from the server 30, as described later. For example, the input reception unit 200 of the mobile terminal 20 displays the thumbnails on the page shown in FIG. 3(d).

The input reception unit 200 of the mobile terminal 20 receives a print setting input of the printing images. For example, the input reception unit 200 of the mobile terminal 20 receives the print setting input of the printing images when "Change" is pressed on the page shown in FIG. 3(e). The input reception unit 200 of the mobile terminal 20 displays the page shown in FIG. 3(e) when "Next" is pressed on the page shown in FIG. 3(d). Preferably, the input reception unit 200 of the mobile terminal 20 displays a page for receiving the print setting input of the printing images so that different pages are displayed depending on the identification information of the printer.

The input reception unit 200 of the mobile terminal 20 receives an input to designate the printing images to be acquired from the server 30. For example, when the thumbnails are designated on the page shown in FIG. 3(c) and when "Start Printing" is pressed on the page shown in FIG. 3(f), the input reception unit 200 of the mobile terminal 20 receives the input to designate the printing images corresponding the thumbnails as the printing images to be acquired from the server 30. The input reception unit 200 of the mobile terminal 20 displays the page shown in FIG. 3(f) when "Next" is pressed on the page shown in FIG. 3(e).

The input reception unit 200 of the mobile terminal 20 displays that the printer 40 has received the printing images. For example, the input reception unit 200 of the mobile terminal 20 displays on the page shown in FIG. 3(g) that the printer 40 has received the printing images.

The mobile terminal local area transceiver 220 of the mobile terminal 20 transmits an identification information request for requesting the identification information of the printer 40 to the printer local area transceiver 420 of the printer 40. The mobile terminal local area transceiver 220 receives the identification information from the printer local area transceiver 420 of the printer 40 as a response to the identification information request. The mobile terminal local area transceiver 220 of the mobile terminal 20 transmits the printing images received by the mobile terminal network transceiver 210 of the mobile terminal 20 to the printer local area transceiver 420 of the printer 40 by performing local area radio communication.

The identification information storage 250 of the mobile terminal 20 stores the identification information of the printer 40. For examples the identification information of the printer 40 received by the mobile terminal local area transceiver 220 of the mobile terminal 20 is stored.

The mobile terminal network transceiver 210 of the mobile terminal 20 transmits a list transmission request to the server network transceiver 310 of the server 30 when an input to acquire the it of the printing images is received by the input reception unit 200. Preferably, the list transmission request includes identification information. With this configuration, the list information of the printing images in accordance with the kind of the printer is displayed, and it is thus easy to acquire the printing images in accordance with the kind of the printers. The mobile terminal network transceiver 210 of the mobile terminal 20 receives the list of the printing images from the server network transceiver 310 of the server 30 as a response to the list transmission request.

The mobile terminal network transceiver 210 of the mobile terminal 20 transmits an image transmission request for requesting the printing images or the thumbnails to the server network transceiver 310 of the server 30 via a network. Specifically, when an input to designate the thumbnails is received by the input reception unit 200, the mobile terminal network transceiver 210 of the mobile terminal 20 transmits the image transmission request for requesting the thumbnails to the server network transceiver 310 of the server 30. Meanwhile, when an input to designate the printing images is received by the input reception unit 200 and when the identification information is received by the mobile terminal local area transceiver 220, the mobile teal network transceiver 210 of the mobile terminal 20 transmits the image transmission request for requesting the printing images, the image transmission request containing the identification information, to the server network transceiver 310 of the server 30. That is, when the input to designate the printing images is received by the input reception unit 200, the mobile terminal network transceiver 210 of the mobile terminal 20 first acquires the identification information and transmits the image transmission request containing the acquired identification information to the server network transceiver 310 of the server 30. Then, the mobile terminal network transceiver 210 of the mobile terminal 20 receives the printing images or the thumbnails from the server network transceiver 310 of the server 30 as a response to the image transmission request.

The image storage 350 of the server 30 stores the printing images or the thumbnails in a correlated manner with the identification information of the printers. For example, for image data of the same contents, plural kinds of image data of which the resolution or tone is different are stored in a correlated manner with the identification information of the printer.

The server network transceiver 310 of the server 30 receives the list transmission request from the mobile terminal network transceiver 210 of the mobile terminal 20. When the list transmission request containing the identification information is received, the server network transceiver 310 of the server 30 extracts the printing images stored in the image storage 350 in a correlated manner with the identification information contained in the list transmission request and transmits the list of the extracted printing images to the mobile terminal network transceiver 210 of the mobile terminal 20.

The server network transceiver 310 of the server 30 receives the image transmission request from the mobile terminal network transceiver 210 of the mobile terminal 20. The server network transceiver 310 of the server 30 transmits the printing images or the thumbnails stored in the image storage 350 to the mobile terminal network transceiver 210 off the mobile terminal 20 as a response to the image transmission request. Specifically, when the image transmission request for requesting the thumbnails from the mobile terminal network transceiver 210 of the mobile terminal 20 is received, the server network transceiver 310 of the server 30 transmits the thumbnails stored in the image storage 350 to the mobile terminal network transceiver 210 of the mobile terminal 20. Meanwhile, when the image transmission request for requesting the printing images from the mobile terminal network transceiver 210 of the mobile terminal 20 is received, the server network transceiver 310 of the server 30 transmits the printing images stored in the image storage 350 in a correlated manner with the identification information contained in the image transmission request to the mobile terminal network transceiver 210 of the mobile terminal 20.

The identification information storage 450 of file printer 40 stores the identification information of the printer 40. The printer local area transceiver 420 of the printer 40 receives an identification information request from the mobile terminal local area transceiver 220 of the mobile terminal 20. Then, the printer local area transceiver 420 of the printer 40 transmits the identification information stored in the identification information storage 450 to the mobile terminal local area transceiver 220 of the mobile terminal 20 as a response to the identification information request. The printer local area transceiver 420 of the printer 40 receives the printing images from the mobile terminal local area transceiver 220 of the mobile terminal 20. Then, the printing unit 430 of the printer 40 performs printing by outputting the printing images on a print sheet.

The mobile terminal 20 may acquire software for executing the operations of the input reception unit 200 via a network. The mobile terminal 20 may acquire the pages displayed by the input reception unit 200 via a network and store the pages in the screen storage 260.

Figure 4:
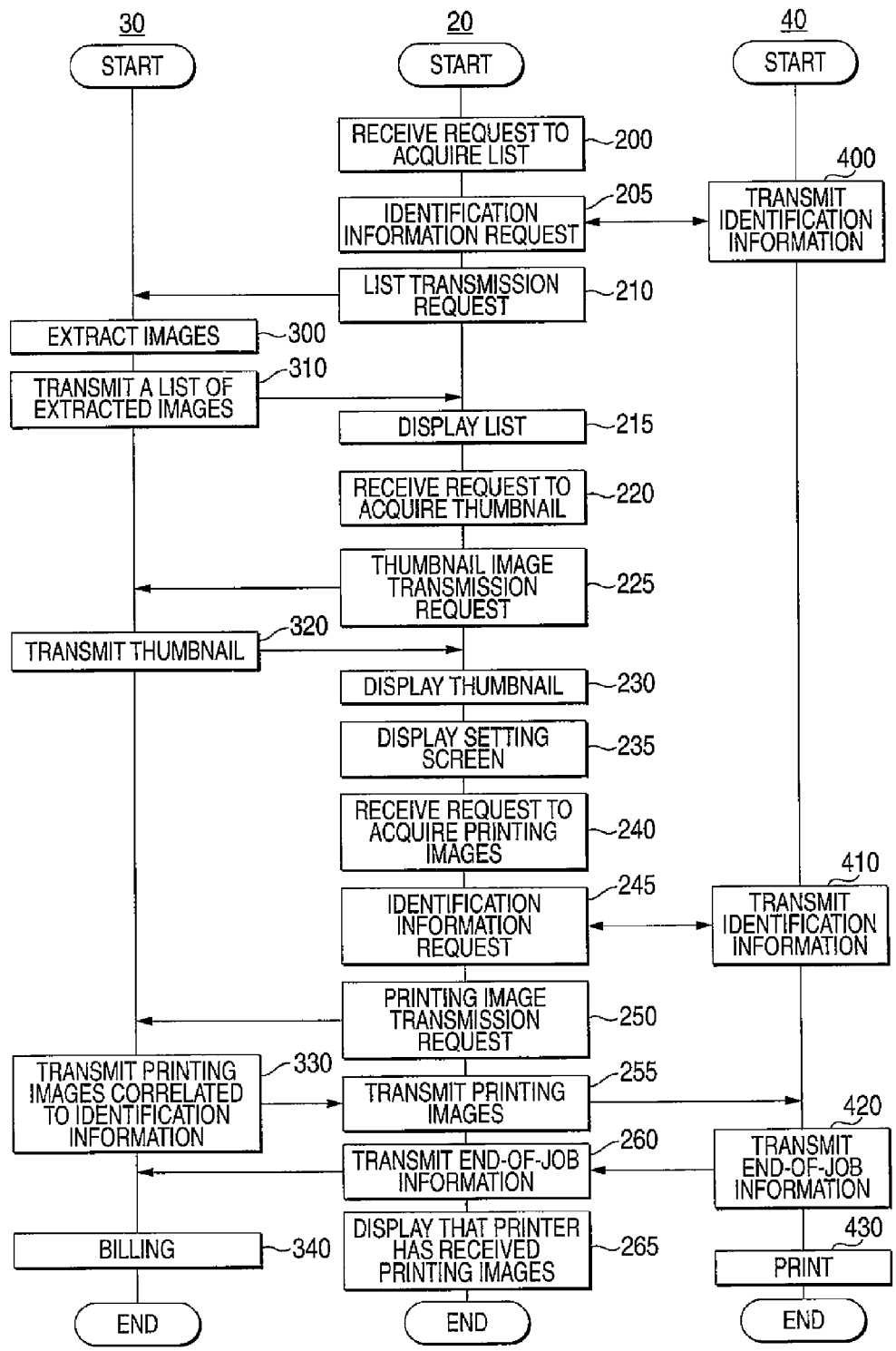
FIG. 4 is a flow chart illustrating an example of the operations of the printing system according to the embodiment.

FIG. 4 is a flow chart showing an example of the operations of the printing system 10. The flow chart starts when the input reception unit 200 of the mobile terminal 20 receives an input to acquire, from the server 30, a list of the printing images stored in the server 30 (S200). The operations of the server 30 are shown on the left side of the flow chart, the operations of the mobile terminal 20 are shown on the center of the flow chart, and the operations of the printer 40 are shows on the right side of the flow chart. It is assumed that at the start of the flow chart, the screen storage 260 of the mobile terminal 20 stores the pages shown in FIGS. 3(a) to 3(g).

The input reception unit 200 of the mobile terminal 20 sends a notification that it has received an input to acquire a list to the mobile terminal local area transceiver 220 of the mobile terminal 20. The mobile terminal local area transceiver 220 of the mobile terminal 20 transmits an identification information request to the printer local area transceiver 420 of the printer 40 (S205). The printer local area transceiver 420 of the printer 40 transmits the identification information stored in the identification information storage 450 to the mobile terminal local area transceiver 220 of the mobile terminal 20 as a response to the identification information request (S400). The mobile terminal local area transceiver 220 of the mobile terminal 20 sends the received identification information to the input reception unit 200 of the mobile terminal 20. Then, the input reception unit 200 of the mobile terminal 20 stores the identification information in the identification information storage 250 of the mobile terminal 20 and sends a notification that it has received in Step S200 the input to acquire the list to the mobile terminal network transceiver 210 of the mobile terminal 20.

The mobile terminal network transceiver 210 of the mobile terminal 20 acquires the identification information stored in the identification information storage 250 of the mobile terminal 20 and transmits a list transmission request containing the identification information to the server network transceiver 310 of the server 30 (S210).

The server network transceiver 310 of the server 30 extracts the printing images stored in the image storage 350 in a correlated manner with the identification information contained in the list transmission request (S300). The server network-transceiver 310 of the server 30 transmits the list of the extracted printing images to the mobile terminal network transceiver 210 of the mobile terminal 20 (S310). The mobile terminal network transceiver 210 of the mobile terminal 20 sends the list of the received printing images to the input reception it 200 of the mobile terminal 20.

The input reception unit 200 of the mobile terminal 20 displays the printing images contained in the lift in a listed view (S215). For example, when a list of the printing images containing "Idle A", "Idle B", and "landscape C" (is sent, the input reception unit 200 of the mobile terminal 20 displays a page shown in FIG. 3(c) for displaying the printing images contained in the list in a listed view (S215). With this configuration, the list information of the printing images in accordance with the printer 40 for use in printing the printing images is displayed, and it is thus easy to acquire the printing images in accordance with the kind of the printer 40.

The input reception unit 200 of the mobile terminal 20 receives an input to designate the thumbnails to be acted from the server 30 (S220). For example, the input reception unit 200 of the mobile terminal 20 receives the input to designate the thumbnails to be acquired from the server 30 through the page shown in FIG. 3(c) for receiving the input to designate the thumbnails to be acquired from the server 30 (S220). The input reception unit 200 of the mobile terminal 20 sends a notification that it has received in Step S220 the input to designate the thumbnails and information that specifies the designated thumbnails to the mobile terminal network transceiver 210 of the mobile terminal 20. The information specifying the thumbnails may be a file name, for example.

The mobile terminal network transceiver 210 of the mobile terminal 20 transmits an image transmission request for requesting the thumbnails to the server network transceiver 310 of the server 30 (S225).

The server network transceiver 310 of the server 30 transmits the thumbnails stored in the image storage 350 to the mobile terminal network transceiver 210 of the mobile terminal 20 (S320). The mobile terminal network transceiver 210 of the mobile terminal 20 sends the received thumbnails to the input reception unit 200 of the mobile terminal 20.

The input reception unit 200 of the mobile terminal 20 displays the sent thumbnails (S230). For example, when the input to designate the thumbnail "Idle A" is received in Step S220, the input reception unit 200 of the mobile terminal 20 displays the page shown in FIG. 3(d) for displaying the thumbnail acquired from the server 30 (S230).

The input reception unit 200 of the mobile terminal 20 acquires the identification information stored in the identification information storage 250 and displays the page for receiving a print setting input of the printing images (S235). For example, when the input reception unit 200 of the mobile terminal 20 is displaying the page shown in FIG. 3(d) and when "Next" is pressed on the page shown in FIG. 3(d), a page shown in FIG. 3(e) for receiving the print setting input of the printing images is displayed (S235).

The input reception unit 200 of the mobile terminal 20 displays a page for receiving an input to start printing of the printing images corresponding to the thumbnails. For example, when "Next" is pressed on the page shown in FIG. 3(e), the input reception unit 200 of the mobile terminal 20 displays a page shown in FIG. 3(f) for receiving the input to start printing of the printing pages corresponding to the thumbnails.

The input reception unit 200 of the mobile terminal 20 receives an input to designate the printing images to be acquired from the server 30 (S240). For example, when "Start Printing" is pressed on the page shown in FIG. 3(t, the input reception unit 200 of the mobile terminal 20 acquires the printing images corresponding to the thumbnails from the server 30 and receives the input to designate the printing images to be acquired from the server 30 (S240). Then, the input reception unit 200 of the mobile terminal 20 sends a notification that it has received the input to designate the printing images to be acquired from the server 30 to the mobile terminal local area transceiver 220 of the mobile terminal 20.

The mobile terminal local area transceiver 220 of the mobile terminal 20 transmits the identification information request to the printer local area transceiver 420 of the printer 40 (S245). Then, the printer local area transceiver 420 of the printer 40 transmits the identification information stored in the identification information storage 450 to the mobile terminal local area transceiver 220 of the mobile terminal 20 as a response to the identification information request (S410). The mobile terminal local area transceiver 220 of the mobile terminal 20 sends the received identification information to the input reception unit 200 of the mobile terminal 20. The input reception unit 200 of the mobile terminal 20 stores the sent identification information in the identification information storage 250 of the mobile terminal 20 and sends a notification that it has received in Step S240 the input to designate the printing images and information that specifies the designated printing images to the mobile terminal network transceiver 210 of the mobile terminal 20. The information specifying the printing images may be a file name, for example.

The mobile terminal network transceiver 210 of the mobile terminal 20 acquires the identification information stored in the identification information storage 250 of the mobile terminal 20 and transmits an image transmission request for requesting the printing images containing the identification information and user information to the server network transceiver 310 of the server 30 (S250). The user information is information that specifies the mobile terminal 20 or the user of the mobile terminal 20 and may be MSISDN (Mobile Subscriber ISDN Number) or IMSI (International Mobile Subscriber Identity).

The server network transceiver 310 of the server 30 transmits the printing sages stored in the image storage 350 in a correlated manner with the identification information contained in the image transmission request to the mobile terminal network transceiver 210 of the mobile terminal 20 (S330). The mobile terminal network transceiver 210 of the mobile terminal 20 sends the received printing images to the mobile terminal local area transceiver 220 of the mobile terminal 20 via the input reception unit 200 of the mobile terminal 20.

The mobile terminal local area transceiver 220 of the mobile terminal 20 transmits the sent printing images to the printer local area transceiver 420 of the printer 40 (S255). The printer local area transceiver 420 of the printer 40 transmits end-of-job information representing that the printer 40 has received the printing images to the mobile terminal local area transceiver 220 of the mobile terminal 20 (S420). The printer local area transceiver 420 of the printer 40 also sends the received printing images to the printing unit 430 of the printer 40. The printer local area transceiver 420 of the printer 40 performs printing by outputting the sent printing images on a print sheet (S430).

The mobile terminal local area transceiver 220 of the mobile terminal 20 sends the received end-of-job information to the input reception unit 200 of the mobile terminal 20. The input reception unit 200 of the mobile terminal 20 transmits the end-of-job information to the server network transceiver 310 of the server 30 (S260). The input reception unit 200 of the mobile-terminal 20 displays that the printer 40 has received the printing images (S265). Specifically, a page shown in FIG. 3(g) for displaying that the printer 40 has received the printing images is displayed (s265).

The server network transceiver 310 of the server 30 sends a notification that it has received the end-of-job information to a billing unit (not shown). Then, the billing unit charges payment for the transmission of the printing images transmitted in Step S330 in a correlated manner with the user information received in Step S250 (S340). In this way, the flow chart completes.

According to the flow chart described above, it is possible to acquire image data optimal to the printer 40 and perform printing based on the optimal image data. For example, among the image data of the same contents of which the resolution or tone is different, image data that is optimal to the kind of the printer 40 is acquired and printing is performed based on the optimal image data. According to the flow chart, the mobile terminal 20 acquires the identification information request immediately before the list of the printing images is acquired and before the printing images are acquired, that is, before the printing images are printed. With this configuration, it is possible to securely specify the printer 40, which is a counterpart of the transmission. In addition, even when the printing is performed using a printer 40 that is different from the printer 40 of which the identification information has been acquired during the acquisition of the list, it is possible to, acquire the printing images that are optimal to the printer 40 for use in the printing.

In the flow chart described above, although the mobile terminal 20 acquires the identification information request immediately before the list of the printing images is acquired (Steps S205 and S400), these steps may be omitted. As an example, subsequent to Step S200, the input reception unit 200 of the mobile terminal 20 may acquire the identification information stored during the previous acquisition in the identification information storage 250 and transmit a list transmission request containing the identification information to the server network transceiver 310 of the server 30 (S210). As another example, subsequent to Step S200, the input reception unit 200 of the mobile terminal 20 may not acquire the identification information and transmit a list transmission request without containing the identification information to the server network transceiver 310 of the server 30 (S210).

In the embodiment described above, although the mobile terminal 20 has the screen storage 260 and the input reception unit 200 of the mobile terminal 20 displays the pages stored in the screen storage 260, the invention is not limited to this. As an example, the server 30 may store all or parts of the pages and the input reception unit 200 of the mobile terminal 20 may acquire the pages from the server 30 and display the pages. When storing the page for receiving the print setting input of the printing images, it is preferable that the server 30 stores the page for receiving the print setting input of the printing images in a correlated manner with the identification information of the printer. With this configuration, when the mobile terminal network transceiver 210 of the mobile terminal 20 transmits a screen request containing the identification information to the server 30, it is possible to acquire a print setting screen in accordance with the kind of the printer for use in printing the printing images and perform print settings in accordance with the kind of the printer.

Although the invention has been described by way of the exemplary embodiments, the technical scope of the invention is not limited to the scope described in the exemplary embodiments. Those skilled in the art will recognize that various modifications or improvements can be made to the details of the exemplary embodiments. It is obvious from the definition of the appended claims that the embodiments with such modifications or improvements also belong to the technical scope of the invention.

What is claimed is:

1. A mobile terminal comprising:
   a local area transceiver operable to transmit an identification information request for requesting identification information of a printing device to the printing device using a local area radio communication and operable to receive the identification information from the printing device;
   a first reception section operable to receive a first input, the first input being an instruction to begin designating thumbnails corresponding to a plurality of printing images stored in an image storage server;
   a first transmitter operable to transmit a first image transmission request including the identification information and a request for the thumbnails to the image storage server when the first input is received by the first reception section;
   a first receiver operable to receive the requested thumbnails corresponding to the identification information from the image storage server;
   a second reception section operable to receive a second input, the second input designating at least one of the plurality of printing images corresponding to the thumbnails received by the first receiver;
   a second transmitter operable to transmit a second image transmission request for requesting the printing images designated by the second input when the second input is received by the second reception section;
   a third transmitter operable to transmit the identification information received from the printing device by the local area transceiver to the image storage server; and
   a second receiver operable to receive the printing images requested by the second transmitter from the image storage server,
   wherein the local area transceiver transmits the printing images received from the image storage server by the second receiver to the printing device,
   wherein when the second input is received by the second reception section, the second transmitter transmits the second image transmission request to the image storage server and the second receiver receives the requested printing images without receiving a printer driver from the image storage server in response to the second image transmission request, and
   wherein the mobile terminal receives end-of-job information from the printing device when the printing device receives the printing images, the end-of-job information representing that the printing device has received the printing images, and then the mobile terminal transfers the end-of-job information to the image storage server and displays a page indicating that the printing device has received the printing images.

2. The mobile terminal as set forth in claim 1, further comprising:
an identification information storage operable to store the identification information; and
a third reception section operable to receive a print setting input for each of the printing images received from the image storage server by causing a display screen to display different print setting screens for each of the printing images received from the image storage server depending on the identification information stored in the identification information storage.

3. The mobile terminal as set forth in claim 1, further comprising:
an identification information storage operable to store the identification information;
a fourth reception section operable to receive an input to acquire a list of printing images stored in the image storage server through a display screen; and
a network transceiver operable to transmit a list transmission request containing the identification information stored in the identification information storage to the image storage server and operable to receive a list of printing images correlated to the identification information contained in the list transmission request when the input to acquire the list is received by the fourth reception section,
wherein when the list is received by the network transceiver, the first reception section receives the first input by causing a display screen to display the list.

4. The mobile terminal as set forth in claim 3, wherein after the fourth reception section receives the input to acquire the list and before the network transceiver transmits the list transmission request to the image storage server, the local area transceiver receives the identification information from the printing device and the identification information storage stores the received identification information.

5. The mobile terminal as set forth in claim 1, further comprising:
an identification information storage operable to store the identification information;
a fourth reception section operable to receive an input to acquire a list of printing images stored in the image storage server; and
a fourth transmitter operable to transmit a list transmission request containing the identification information stored in the identification information storage to the image storage server,
wherein when the fourth reception section receives the input to acquire the list, the mobile terminal determines whether or not the identification information has been stored in the identification information storage,
wherein if the mobile terminal determines that the identification information has not been stored in the identification information storage, the local area transceiver transmits the identification information request to the printing device and receives the identification information from the printing device, the identification information storage stores the identification information received from the printing device, and the fourth transmitter transmits the list transmission request containing the identification information stored in the identification information storage to the image storage server, and
wherein if the mobile terminal determines that the identification information has been stored in the identification information storage, the fourth transmitter transmits the list transmission request containing the identification information stored in the identification information storage to the image server without transmitting the identification information request to the printing device through the local area transceiver.

6. A printing system, comprising:
a mobile terminal;
an image storage server; and
a printing device,
wherein the mobile terminal comprises:
a local area transceiver operable to transmit an identification information request for requesting identification information of the printing device to the printing device using a local area radio communication and operable to receive the identification information from the printing device:
a first reception section operable to receive a first input, the first input being an instruction to begin designating thumbnails corresponding to a plurality of printing images stored in the image storage server;
a first transmitter operable to transmit a first image transmission request including the identification information and a request for thumbnails corresponding to the identification information to the image storage server when the first input is received by the first reception section:
a first receiver operable to receive the requested thumbnails corresponding to the identification information from the image storage server;
a second reception section operable to receive a second input, the second input designating at least one of the plurality of printing images corresponding to the thumbnails received by the first receiver;
a second transmitter operable to transmit a second image transmission request for requesting the printing images designated by the second input when the second input is received by the second reception section;
a third transmitter operable to transmit the identification information received from the printing device by the local area transceiver to the image storage server; and
a second receiver for receiving the printing images requested by the second transmitter from the image storage server;
wherein the image storage server comprises:
an image storage storing the plurality of printing images and the thumbnails in a correlated manner with the identification information;
a server receiver operable to receive the first image transmission request from the first transmitter and the second image transmission request from the second transmitter;
a first server transmitter operable to transmit the thumbnails stored in the image storage to the first receiver when the first image transmission request is received by the server receiver from the first transmitter; and
a second server transmitter operable to transmit requested printing images stored in the image storage to the second receiver when the second image transmission request is received by the server receiver from the second transmitter; and
wherein the local area transceiver transmits the printing images received by the second receiver to the printing device,
wherein when the second input is received by the second reception section, the second transmitter transmits the second image transmission request to the server receiver,
wherein the second server transmitter transmits the requested printing images stored in the image storage to the second receiver without transmitting a printer driver to the second receiver in response to the second image transmission request, and wherein the printing device transmits end-of-job information to the mobile terminal when receiving the printing images, the end-of-job information representing that the printing device has received the printing images, and then the mobile terminal transfers the end-of-job information to the image storage server and displays a page indicating that the printing device has received the printing images.

7. The printing system as set forth in claim 6, wherein the mobile terminal further comprises:

an identification information storage operable to store the identification information;

a third reception section operable to receive an input to acquire a list of printing images stored in the image storage; and a fourth transmitter operable to transmit a list transmission request containing the identification information stored in the identification information storage to the image storage server when the input to acquire the list is received by the third reception section;

wherein the image storage server further comprises a third server transmitter operable to extract printing images stored in the image storage in a correlated manner with the identification information contained in the list transmission request and operable to transmit a list of the extracted printing images to the mobile terminal when the list transmission request containing the identification information is received from the fourth transmitter; and wherein when the list of extracted printing images is transmitted from the third server transmitter, the first reception section receives the first input by causing a display screen to display the list of extracted printing images.

8. The printing system as set forth in claim 6, wherein the mobile terminal further comprises:

an identification information storage operable to store the identification information;

a third reception section operable to receive an input to acquire a list of printing images stored in the image storage server; and a fourth transmitter operable to transmit a list transmission request containing the identification information stored in the identification information storage to the image storage server, wherein when the third reception section receives the input to acquire the list, the mobile terminal determines whether or not the identification information has been stored in the identification information storage, wherein if the mobile terminal determines that the identification information has not been stored in the identification information storage, the local area transceiver transmits the identification information request to the printing device and receives the identification information from the printing device, the identification information storage stores the identification information received from the printing device, and the fourth transmitter transmits the list transmission request containing the identification information stored in the identification information storage to the image storage server, and wherein if the mobile terminal determines that the identification information has been stored in the identification information storage, the fourth transmitter transmits the list transmission request containing the identification information stored in the identification information storage to the image storage server without transmitting the identification information request to the printing device through the local area transceiver.

9. A printing method using a mobile terminal that acquires printing images from an image storage server that stores the printing images and thumbnails of the printing images in a correlated manner with identification information of a printing device for printing the printing images and transmits the acquired printing images to the printing device, the printing method comprising:

a local area transmitting step for transmitting an identification information request for requesting the identification information of the printing device to the printing device using a local area radio communication;

a local area receiving step for receiving the identification information from the printing device, a reception step for receiving an input to designate the printing images or an input to designate the thumbnails of the printing images, to be acquired from the image storage server through a display screen;

a first network transmitting step for transmitting a first image transmission request including the identification information and a request for the thumbnails to the image storage server via a network;

a second network transmitting step for transmitting a second image transmission request for requesting the printing images to the image storage server via the network; and a network receiving step for receiving the printing images or the thumbnails corresponding to the identification information from the image storage server via the network;

wherein when an input to designate the thumbnails of the printing images is received in the reception step, the first image transmission request is transmitted to the image storage server in the first network transmitting step and designated thumbnails are received from the image storage server in the network receiving step, wherein when an input to designate the printing images corresponding to the designated thumbnails is received in the reception step, the second image transmission request is transmitted to the image storage server in the second network transmitting step and designated printing images are received from the image storage server in the network receiving step;

wherein the printing images received from the image storage server are transmitted to the printing device in the local area transmitting step, wherein when the input to designate the printing images corresponding to the designated thumbnails is received in the reception step, the second image transmission request is transmitted from the mobile terminal to the image storage server and the printing images correlated to the identification information are transmitted from the image storage server to the mobile terminal without transmitting a printer driver from the image storage server to the mobile terminal in response to the second image transmission request, and wherein the mobile terminal receives end-of-job information from the printing device when the printing device receives the printing images in the local area transmitting step, the end-of-job information representing that the printing device has received the printing images, and then the mobile terminal transfers the end-of-job information to the image storage server and displays a page indicating that the printing device has received the printing images.

10. The printing method as set forth in claim 9,
wherein the mobile terminal includes an identification information storage operable to store the identification information,
wherein the printing method further comprises:
 a receiving step for receiving an input to acquire a list of printing images stored in the image storage server;
 a determining step for determining whether or not the identification information has been stored in the identification information storage when the input to acquire the list is received in the receiving step; and
 a transmitting step for transmitting a list transmission request containing the identification information stored in the identification information storage to the image storage server,
wherein if it is determined that the identification information has not been stored in the identification information storage in the determining step, the identification information request is transmitted to the printing device in the local area transmitting step, the identification information is received from the printing device in the local area transmitting step, the identification information received from the printing device is stored in the identification information storage, and the list transmission request containing the identification information stored in the identification information storage is transmitted to the image storage server in the transmitting step, and
wherein if it is determined that the identification information has been stored in the identification information storage in the determining step, the list transmission request containing the identification information stored in the identification information storage is transmitted to the image storage server in the transmitting step without transmitting the identification information request to the printing device in the local area transmitting step.

* * * * *